US009626147B2

(12) United States Patent
Chang et al.

(10) Patent No.: US 9,626,147 B2
(45) Date of Patent: Apr. 18, 2017

(54) METHOD FOR CONTROLLING A DISPLAY APPARATUS, SINK APPARATUS THEREOF, MIRRORING SYSTEM THEREOF

(71) Applicant: Samsung Electronics Co., Ltd., Suwon-si, Gyeonggi-do (KR)

(72) Inventors: Soo-ho Chang, Seoul (KR); Do-il Kwon, Seongnam-si (KR); Artem Kozlov, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 14/474,679

(22) Filed: Sep. 2, 2014

(65) Prior Publication Data

US 2015/0067549 A1 Mar. 5, 2015

(30) Foreign Application Priority Data

Sep. 4, 2013 (KR) .................. 10-2013-0106304

(51) Int. Cl.
*G06F 3/048* (2013.01)
*G06F 3/14* (2006.01)
*G06F 3/0488* (2013.01)
*G06F 3/0484* (2013.01)
*H04N 21/41* (2011.01)

(52) U.S. Cl.
CPC .......... *G06F 3/1454* (2013.01); *G06F 3/0484* (2013.01); *G06F 3/0488* (2013.01); *H04N 21/4122* (2013.01)

(58) Field of Classification Search
CPC ................................. H04N 21/4122

USPC ........................................................ 715/765
See application file for complete search history.

(56) References Cited

U.S. PATENT DOCUMENTS

| 5,654,726 | A | 8/1997 | Mima et al. |
| 8,745,285 | B2 * | 6/2014 | Eguchi ............. H04N 21/43637 710/15 |
| 2002/0054044 | A1 | 5/2002 | Lu et al. |
| 2007/0250864 | A1 * | 10/2007 | Diaz Perez ............ G06Q 30/02 725/52 |

(Continued)

FOREIGN PATENT DOCUMENTS

KR 1218295 B1 1/2013

OTHER PUBLICATIONS

"Wi-Fi Display Technical Specification Version 1.0.0", Wi-Fi Alliance, 2012, pp. 1-149.

*Primary Examiner* — William Titcomb
(74) *Attorney, Agent, or Firm* — Jefferson IP Law, LLP (57) ABSTRACT

A display device controlling method, a sink device thereof, and a mirroring system thereof are provided. The display device controlling method includes receiving metadata and media data for mirroring a screen image at a sink device from a source device, if a request is received, determining whether the request is an independent request for requesting to perform an operation of the sink device independent from an operation of the source device, or a dependent request for requesting to perform an operation of the sink device dependent to an operation of the source device, and, if the request is an independent request, carrying out the request at the sink device. When the request is input to the sink device, an operation desired by a user may be quickly performed.

20 Claims, 6 Drawing Sheets

(56) References Cited

U.S. PATENT DOCUMENTS

| | | | |
|---|---|---|---|
| 2011/0134120 A1* | 6/2011 | Antonyuk | G06F 3/1454 345/426 |
| 2011/0202854 A1 | 8/2011 | Chan et al. | |
| 2013/0021531 A1* | 1/2013 | Eguchi | H04N 21/43637 348/723 |
| 2013/0141331 A1* | 6/2013 | Shiu | G09G 5/003 345/158 |
| 2013/0148720 A1* | 6/2013 | Rabii | G06F 3/1454 375/240.12 |
| 2013/0179029 A1* | 7/2013 | Wang | H04L 65/4092 701/32.7 |
| 2013/0208789 A1* | 8/2013 | Shapira | H04N 5/38 375/240.02 |
| 2013/0278484 A1* | 10/2013 | Hwang | G06F 3/1423 345/2.3 |
| 2013/0328878 A1* | 12/2013 | Stahl | G06F 3/1431 345/428 |
| 2014/0009394 A1* | 1/2014 | Lee | H04N 5/4403 345/157 |
| 2014/0078020 A1* | 3/2014 | Yamada | G06F 3/147 345/1.1 |
| 2014/0104138 A1* | 4/2014 | Brown | G06F 3/1423 345/1.1 |
| 2014/0223490 A1* | 8/2014 | Pan | H04N 21/42224 725/61 |
| 2014/0245194 A1* | 8/2014 | Wright | G06F 9/4445 715/761 |
| 2014/0282755 A1* | 9/2014 | Alsina | H04N 21/6587 725/88 |
| 2014/0351722 A1* | 11/2014 | Frederickson | G06F 9/4443 715/761 |
| 2014/0361954 A1* | 12/2014 | Epstein | G06F 3/1454 345/2.3 |
| 2014/0365611 A1* | 12/2014 | Praveenkumar | H04L 69/24 709/219 |
| 2016/0219340 A1* | 7/2016 | Perez | H04N 21/47202 |

* cited by examiner

METHOD FOR CONTROLLING A DISPLAY APPARATUS, SINK APPARATUS THEREOF, MIRRORING SYSTEM THEREOF

CROSS-REFERENCE TO RELATED APPLICATION(S)

This application claims the benefit under 35 U.S.C. §119 (a) of a Korean patent application filed on Sep. 4, 2013 in the Korean Intellectual Property Office and assigned Serial number 10-2013-0106304, the entire disclosure of which is hereby incorporated by reference.

TECHNICAL FIELD

The present disclosure relates to a method of controlling a display apparatus, a sink apparatus thereof, and a mirroring system thereof. More particularly, the present disclosure relates to a method of controlling a display apparatus by mirroring content that are displayed on at least one display apparatus on at least one other display apparatus, a sink apparatus thereof, and a mirroring system thereof.

BACKGROUND

Along with developments in wired/wireless communication networks, electronic devices which output visually recognizable data by displaying screen images may be connected to one another via wired/wireless communication networks.

Electronic devices may transmit and receive various data via wired/wireless communication networks, and an electronic device may remotely control another electronic device. Alternatively, an electronic device may be controlled via another electronic device. A mirroring technique is used for the remote-control or the shared control from among electronic devices.

The mirroring technique is a technique that enables electronic devices including display units to share and operate screen data. For example, the mirroring technique enables Personal Computers (PCs) to share and use screen data.

Furthermore, the mirroring technique is being widely developed to be applied to all electronic devices capable of outputting screens via display units, such as portable computers including laptop computers, net-book computers, and tablet PCs, portable terminals including smart phones and Personal Digital Assistants (PDAs), and smart TVs.

For example, currently available techniques for providing mirroring services that enables a plurality of electronic devices to share screens and to remote control one another by employing a mirroring technique include Display as a Service (DaaS), Miracast, Airplay, and/or the like.

Hereinafter, all electronic devices which may use a mirroring service by share and display screens will be referred to as 'display devices.'

In a mirroring service, content including video data or audio data is transmitted from at least one content-providing device to at least one content-receiving device. The content-providing device may be referred to as a source device or a master device, whereas the content-receiving device may be referred to as a sink device or a client device. Hereinafter, a content-providing device will be referred to as a source device, and a content-receiving device will be referred to as a sink device.

If a display device uses a mirroring service, the display device is generally required to transmit and receive data (e.g., with a counterpart device). If any of the display devices is operated, the operation should be reflected to the other display devices and an action corresponding to the operation should be performed. Therefore, time is elapsed for transmitting and receiving data or commands or requests based on user inputs, and a user may be bored and feel inconvenience if the time elapsed for transmission/reception increases.

Therefore, there is a demand for a method and an apparatus for quickly mirroring content shared by users and quickly performing designated actions in response to user operations The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of controlling a display apparatus that enables a quick reaction to a user operation, a sink device thereof, and a mirroring system thereof.

In accordance with an aspect of the present disclosure, a display device controlling method is provided. The display device includes receiving metadata and media data for mirroring a screen image at a sink device from a source device, if a request is received, determining whether the request is an independent request for requesting to perform an operation of the sink device independent from an operation of the source device or a dependent request for requesting to perform an operation of the sink device dependent to an operation of the source device, and, if the request is an independent request, carrying out the request at the sink device.

In accordance with an aspect of the present disclosure, the carrying out of the request at the sink device includes, if the request is the independent request, performing an operation corresponding to the dependent request at the sink device before the dependent request is carried out by the source device.

In accordance with an aspect of the present disclosure, the metadata is used to analyze the dependent request at the sink device.

In accordance with an aspect of the present disclosure, the display device controlling method further includes displaying a mirroring screen image at the sink device by mirroring a screen image displayed at the source device using the media data.

In accordance with an aspect of the present disclosure, the display device controlling method further includes receiving the request via a user interface screen displayed in the sink device.

In accordance with an aspect of the present disclosure, the metadata is includes information for location of a menu on the user interface screen corresponding to a request.

In accordance with an aspect of the present disclosure, the metadata includes information regarding at least one of (i) location information including at least one of information, pixel locations, and coordinates information regarding points on a user interface screen, and (ii) information regarding at least one menu included in the user interface screen.

In accordance with an aspect of the present disclosure, the determining of whether the request is the independent request or the dependent request includes detecting a user's operation and obtaining the location information corresponding to a location at which the user's operation is detected, determining the menu corresponding to the obtained location information as the request, and determining whether the recognized request is the independent request.

In accordance with an aspect of the present disclosure, the display device controlling method further includes, if the request is the independent request, transmitting information regarding the independent request to the source device.

In accordance with an aspect of the present disclosure, the display device controlling method further includes, if the request is the dependent request, transmitting information regarding the dependent request to the source device, performing an operation corresponding to the dependent request at the source device, transmitting changed media data corresponding to the operation performed at the source device to the sink device, and mirroring the screen image by using the changed media data.

In accordance with an aspect of the present disclosure, the display device controlling method further includes, after the request is carried out, synchronizing the source device and the sink device to each other.

In accordance with an aspect of the present disclosure, the dependent request includes at least one of a request for zooming in/out a screen image, a request for stopping playback of content currently being played back, a request for editing a screen image, and a request for modifying a screen image, such as scroll or rotation of the screen image.

In accordance with another aspect of the present disclosure, a sink device is provided. The sink device includes a communication module, which receives metadata and media data for mirroring a screen image from a source device, a display unit configured to display a screen image corresponding to the media data, and a controller configured to, if a request is received, determine whether the request is an independent request for requesting to perform an operation of the sink device independent from an operation of the source device or a dependent request for requesting to perform an operation of the sink device dependent to an operation of the source device and, if the request is an independent request, carry out the request at the sink device.

In accordance with another aspect of the present disclosure, a mirroring system is provided. The mirroring system includes a source device and a sink device which mirrors an screen image displayed at the source device, wherein the source device transmits metadata and media data for mirroring a screen image to the sink device, the sink device displays a screen image by using the media data, and, if a request is received, a determination is made as to whether the request is an independent request for requesting to perform an operation of the sink device independent from an operation of the source device or a dependent request for requesting to perform an operation of the sink device dependent to an operation of the source device and, if the request is an independent request, the request is carried out at the sink device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions such as "at least one of," when preceding a list of elements, modify the entire list of elements and do not modify the individual elements of the list.

Hereinafter, methods of controlling a display device according to various embodiments of the present disclosure, a sink device thereof, and a mirroring system thereof will be described in detail.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a sink device, a source device and the display device may respectively be electronic devices.

Figure 1:
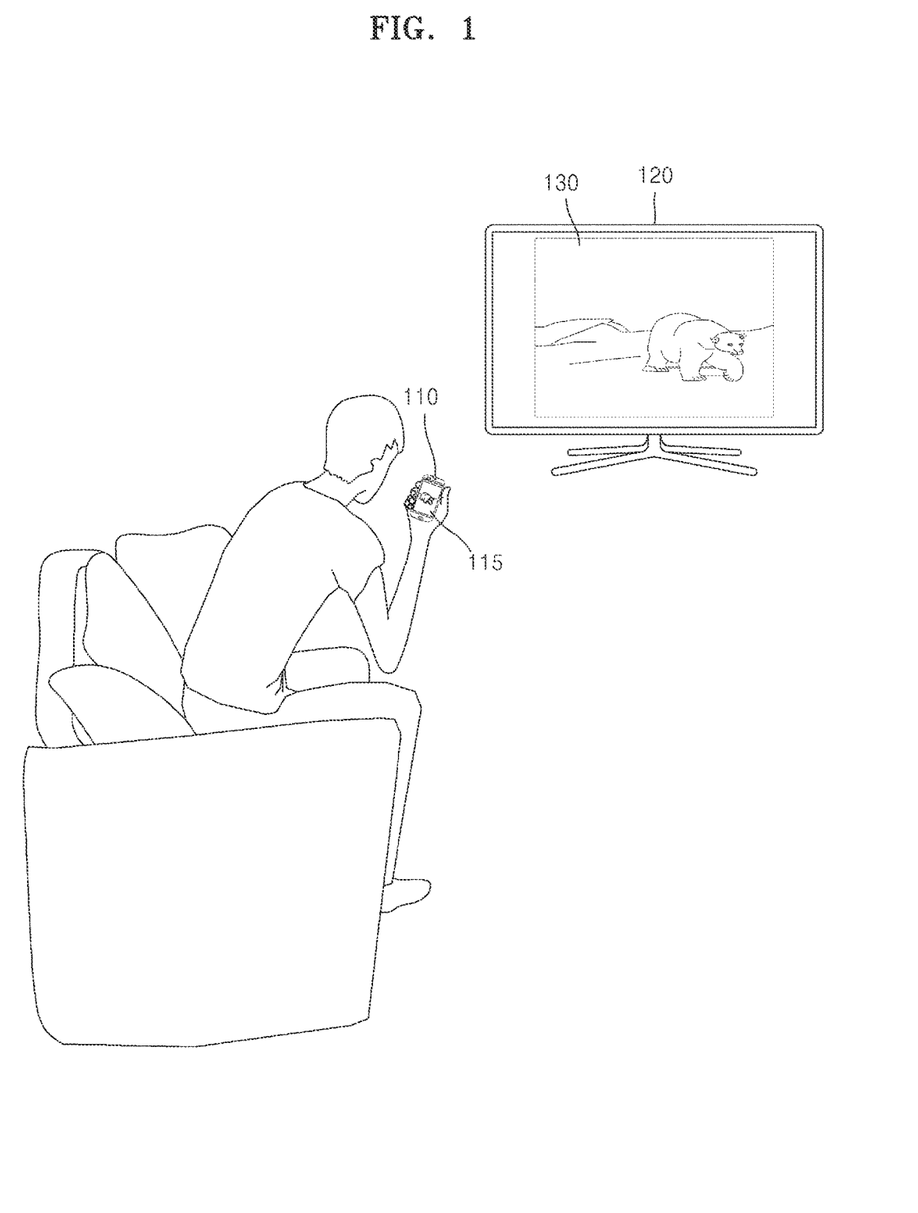
FIG. 1 is a diagram for describing a mirroring technique according to an embodiment of the present disclosure.

FIG. 1 is a diagram for describing a mirroring technique according to an embodiment of the present disclosure.

Referring to FIG. 1, a case in which a source device is a smart phone 110 handheld by a user and a sink device is a smart TV 120 watched by the user is provided.

The user may use a mirroring service between the smart phone 110 and the smart TV 120 to access movies, dramas, pictures, music, documents, and the like stored in the smart TV 120. The smart phone 110 and the smart TV 120 are connected to each other. For example, the smart phone 110 and the smart TV 120 may be connected via a designated network (not shown). According to various embodiments of the present disclosure, the smart phone 110 and the smart TV 120 may be directly connected with each other (e.g., using a wireless technique such as WiFi Direct, Bluetooth, and/or the like). According to various embodiments of the present disclosure, the smart phone 110 and the smart TV 120 may be connected through a network (e.g. through a router, through the Internet, and/or the like).

By using a mirroring service, a screen displayed by a display unit 130 of the smart TV 120 may be mirrored and displayed by a display unit 115 of the smart phone 110. Similarly, a screen displayed on the display unit 115 of the smart phone 110 may be mirrored and displayed by a display unit 130 of the smart TV 120.

For example, it is assumed that a screen displayed by the display unit 130 is mirrored and displayed by the display unit 115. In detail, the user may mirror a movie content being played back by the display unit 130 of the smart TV 120 and view the movie content via the display unit 115 of the smart phone 110. Furthermore, the user may mirror screens displayed by the display unit 130 of the smart TV 120 located at the living room and view the movie content via the display unit 115 of the smart phone 110 at a library.

According to various embodiments of the present disclosure, to use a mirroring service, the smart TV 120 and the smart phone 110 are connected by a wire or wirelessly via a designated network. FIG. 1 shows a case in which the smart TV 120 and the smart phone 110 are connected to each other via a Wi-Fi communication network. Furthermore, in FIG. 1, the Miracast is used as a platform for providing a mirroring service.

A Miracast-based screen mirroring is operated by transmitting (i) controls, such as connection, start, or pause, regarding the mirroring service, (ii) data, such as pictures, moving pictures, music, documents, application data, and/or the like, and (iii) screen controls performed at a sink device, such as touch up/down, screen zoom, screen scroll, screen rotation, and/or the like from a source device to the sink device.

When a user inputs a designated request via a screen shared to a sink device, control information for performing the designated request is encapsulated (e.g., generated) and is transmitted to a source device via a User Input Back Channel (UIBC). The source device decapsulates (e.g., processes) the transmitted control information and recognizes the control information. Next, the source device applies the recognized control information to a media content that is being reproduced and transmits the media content, to which the control information is applied, back to the sink device. Therefore, the sink device mirrors and reproduces the media content, to which the control information is applied.

As described above, even if a user inputs an instruction for a sink device to perform a particular operation, the actual control operation may be performed first by a source device mirrored by the sink device, and the sink device may receive a result of the control operation performed by the source device. According to various embodiments of the present disclosure, any instruction or request should be performed via the source device.

Therefore, according to the Miracast-based screen mirroring, when a user inputs a designated request via a screen image shared to a sink device, a period of time for transmitting control information to a source device and performing an operation therefor at the source device is required for the sink device to change a screen image being reproduced in accordance with the designated request.

When a user inputs a designated request via a screen image shared to a sink device, minimizing data transmission and reception between a source device and the sink device may be beneficial in order for the sink device to quickly display a screen image requested by the user.

Hereinafter, referring to FIGS. 2 through 6, a method of controlling a display apparatus for quickly reacting to a user input and quickly displaying a screen image corresponding to the user input, a sink device thereof, and a mirroring system thereof will be described in details.

Figure 2:
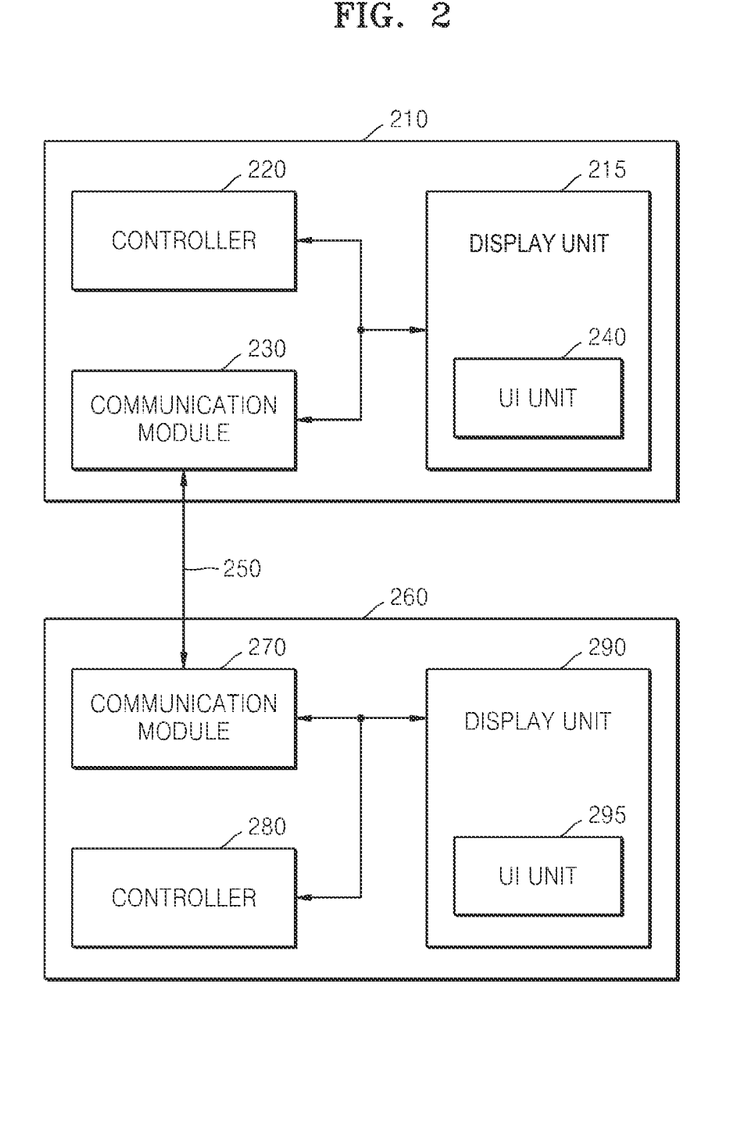
FIG. 2 is a diagram showing a source device according to an embodiment of the present disclosure and a mirroring system thereof.

FIG. 2 is a diagram showing a source device according to an embodiment of the present disclosure and a mirroring system thereof.

Referring to FIG. 2, a display device according to an embodiment of the present disclosure is an electronic device which may use a mirroring service via the designated network. The display device may be a source device 210 or a sink device 260. The at least one source device 210 and the at least one sink device 260 are mutually connected. For example, the at least one source device 210 and the at least one sink device 260 may be connected via a designated communication network 250. According to various embodiments of the present disclosure, the source device 210 and the sink device 260 may be directly connected with each other (e.g., using a wireless technique such as WiFi Direct, Bluetooth, and/or the like). According to various embodiments of the present disclosure, the at least one source device 210 and the at least one sink device 260 may remotely control or use each other.

According to various embodiments of the present disclosure, although configurations and operations of the source device 210 and the sink device 260 are similar to those of each other, a display device which transmits a mirroring screen image is referred to as the source device 210, whereas a display device which receives the mirroring screen image is referred to as the sink device 260. Furthermore, the display device according to an embodiment of the present disclosure (e.g., a source device or a sink device), is an electronic device including a display unit and may be portable computers including laptop computers, net-book computers, and tablet PCs, portable terminals including smart phones and Personal Digital Assistants (PDAs), desktop PCs, and smart TVs, and/or the like.

Furthermore, at least one source device and at least one sink device that are capable of providing a mirroring service may be mutually connected in any of various methods.

According to various embodiments of the present disclosure, one source device and one sink device may be mutually connected via an 1:1 network topology.

According to various embodiments of the present disclosure, one source device and a plurality of sink devices may be mutually connected via an 1:n network topology. According to such various embodiments of the present disclosure, n denotes the number of the plurality of sink devices.

According to various embodiments of the present disclosure, a plurality of source device and one sink device may be mutually connected via an n:1 network topology. According to such various embodiments of the present disclosure, n denotes the number of the plurality of source devices.

According to various embodiments of the present disclosure, a plurality of source devices and a plurality of sink device may be mutually connected via an m:n network topology. According to such various embodiments of the present disclosure, m denotes the number of the plurality of source devices, whereas n denotes the number of the plurality of sink devices.

As illustrated in FIG. 2, a case in which the one source device 210 and the one sink device 260 are mutually connected via a 1:1 network topology and provide a mirroring service will be described.

First, the source device 210 will be described in detail.

Referring to FIG. 2, the source device 210 may include a controller 220, a display unit 215, and a communication module 230. Furthermore, the source device 210 may further include a User Interface (UI) unit 240. Furthermore, the UI unit 240 may be combined with the display unit 215.

The controller 220 generates media data. In detail, the controller 220 may decode video data, such as still picture data or moving picture data, audio data, application data, and/or the like, and generate a screen image or audio to be reproduced by the display unit 215. Furthermore, the controller 220 may generate a menu screen image or a UI screen image.

The display unit 215 displays media data generated by the controller 220. In detail, the display unit 215 outputs a designated screen image corresponding to the media data generated by the controller 220 via a display panel (not shown).

The communication module 230 transmits and receives data with other display devices connected to the source device 210. For example, the communication module 230 transmits and receives data with other display devices connected via the designated communication network 250. In detail, the communication module 230 may transmit media data generated by the controller 220 to at least one other display device (e.g., a communication module 270 of the sink device 260).

The designated communication network 250 is a wired/wireless communication network for transmitting and receiving designated data. The designated communication network 250 may be established via any of various communication network standards, such as Local Area Network (LAN), Wide Area Network (WAN), Wireless LAN (WLAN) (Wi-Fi), Wireless broadband (Wibro), CDMA, WCDMA, Near Field Communication (NFC), and/or the like.

The communication module 230 may include at least one communication module for accessing the designated communication network 250 by a wire or wirelessly. For example, the communication module 230 may include a WLAN (Wi-Fi) module, a Wibro module, a World interoperability for microwave access (Wimax) module, a CDMA module, a WCDMA module, a close-distance communication module, and/or the like.

Furthermore, the communication module 230 may include a NFC-based communication module, thereby supporting a near field connection. Therefore, when the source device 210 and the sink device 260 approach or contact each other, designated data may be exchanged there between using the NFC-based communication module.

The UI unit 240 may receive a request, an instruction, or other data for controlling an operation of the source device 210 from a user and may control other components to perform an operation corresponding to the request, the instruction, or the data input by the user. The UI unit 240 may include a touch pad (not shown) combined with the display unit 215, a keypad (not shown) which includes software keys or hardware keys corresponding to designated request or instructions, and/or the like.

Furthermore, the UI unit 240 may be combined with the display unit 215. In detail, the display unit 215 may provide a UI screen image for receiving an input of a request, an instruction, or other data for controlling an operation of the source device 210 from a user. In detail, the display unit 215 may include a touch pad (not shown) combined with the display unit 215, a keypad (not shown) which includes software keys or hardware keys corresponding to designated request or instructions, and/or the like.

For example, if the display unit 215 includes a touch pad, the display unit 215 displays a UI screen image on a display panel combined with the touch pad. When a user touches a designated location on the UI screen image, the display unit 215 may detect the touched location and transmit information regarding the detection to the UI unit 240. The UI unit 240 may recognize a request or an instruction of the user corresponding to a menu displayed at the detected location and may control the other components to perform the recognized request or instruction.

Hereinafter, a case in which UI unit 240 and UI unit 295 are respectively combined with display unit 215 and display unit 290 will be described.

Operations for performing a mirroring service will be described below.

When a mirroring service is requested via the UI unit 240 (e.g., in response to a request for performing a mirroring service), the controller 220 executes the requested mirroring service. Furthermore, a mirroring service request may be input via the UI unit 295 of the sink device 260.

In detail, the controller 220 generates a transmission stream by encoding and streaming media data of a screen image currently being displayed. Thereafter, the communication module 230 transmits the transmission stream generated by the controller 220 to the sink device 260.

The sink device 260 is a display device which mirrors at least one screen image displayed on the source device 210 and which displays the mirrored screen image on at least one other display device connected to the source device 210 via the designated communication network 250.

Detailed descriptions of the sink device 260 will be given below.

The sink device 260 may have a similar configuration as the source device 210. For example, the sink device 260 may include the communication module 270, a controller 280, and a display unit 290. Furthermore, the sink device 260 may further include the UI unit 295.

The controller 280, the display unit 290, the communication module 270, and the UI unit 295 may respectively correspond to the controller 220, the display unit 215, the communication module 230, and the UI unit 240 that are described above. Therefore, descriptions already given above with respect to the source device 210 will be omitted below.

The communication module 270 receives at least one piece of media data and metadata for mirroring a screen image of at least one other display device. The communication module 270 may be connected to the communication module 230 of the source device 210. For example, the communication module 270 may be connected to the communication module 230 of the source device 210 via the designated communication network 250 by a wire or wirelessly and receives media data which includes a designated screen image and is transmitted by the communication module 230. According to various embodiments of the present disclosure, the communication module 270 may be directly connected to the communication module 230 of the source device 210 (e.g., using a wireless technique such as WiFi Direct, Bluetooth, and/or the like).

The controller 280 generates a designated screen image corresponding to at least one from among received media data or at least one designated portion of the at least one piece of media data. According to various embodiments of the present disclosure, in order to mirror at least one piece of media data being displayed on at least one other display device (e.g., at least one source device), the controller 280 generates a designated screen image corresponding to received media data.

Furthermore, the controller 280 may either mirror the entire screen image corresponding to received media data or mirror a designated partial image corresponding to a portion of received media data. Furthermore, if a plurality of pieces of media data corresponding to a plurality of screen images are received, then one screen image may be generated by combining at least one from among the plurality of pieces of media data.

If a designated request is input, then the controller 280 interprets the designated request by using metadata. The controller 280 determines whether the designated request is an independent request requesting to perform an operation of the sink device 260 that is independent from an operation of the source device 210 or a dependent request requesting to perform an operation of the sink device 260 that is dependent to an operation of the source device 210. If the designated request is an independent request, then the designated request is carried out at the sink device 260.

The display unit 290 displays a designated screen image generated by the controller 280. Because a mirroring service is being executed, the display unit 290 and the display unit 215 display a same screen image.

Furthermore, the UI unit 295 combined with the display unit 290 may receive an input of a designated request or instruction from a user via a UI screen image. For example, if the display unit 290 displays a menu screen image for controlling content reproduction, a user may input a designated instruction (e.g., fast-forward instruction), by touching the menu screen image.

Furthermore, detailed descriptions of operations performed by the sink device 260 will be described below in detail with reference to FIGS. 3 through 6.

Figure 3:
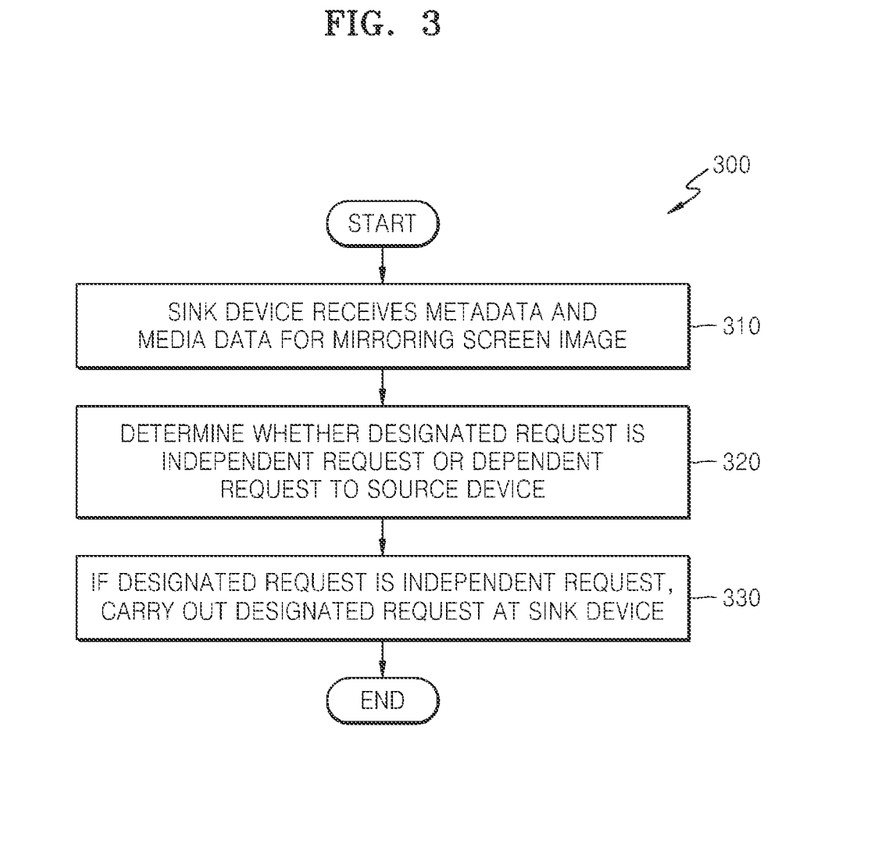
FIG. 3 is a flowchart showing a display device controlling method according to an embodiment of the present disclosure.

FIG. 3 is a flowchart showing a display device controlling method according to an embodiment of the present disclosure.

Referring to FIG. 3, the display device controlling method 300 according to various embodiments of the present disclosure may be performed by at least one from between the sink device 260 and the source device 210, where operations included in the display device controlling method 300 are similar (e.g., identical) to operations performed at the sink device 260 or the source device 210. Therefore, descriptions already given above with reference to FIG. 2 will be omitted below.

At operation 310, the sink device 260 receives metadata and media data for mirroring a screen image from the source device 210. The sink device 260 may receive metadata and media data for mirroring a screen image using the communication module 270 of the sink device 260.

According to various embodiments of the present disclosure, media data for screen mirroring is media data including screen images displayed by the display unit 215 of the source device 210. For example, if the source device 210 is reproducing moving pictures using a moving picture player, then the media data transmitted at the operation 310 may be the reproduction window of the moving picture player.

According to various embodiments of the present disclosure, metadata may be data used by the sink device 260 to analyze a designated request if the sink device 260 is mirroring the source device 210. Detailed descriptions of the metadata will be given below with reference to FIGS. 4 through 6.

Using the media data received at the operation 310, a mirrored screen image is displayed (operation not shown). For example, the sink device 260 uses the received media data to display a mirrored screen image.

At operation 320, in response to an input of a designated request, a determination is made as to whether the designated request is an independent request or a dependent request to the source device 210. For example, when a designated request is input, a determination is made as to whether the designated request is an independent request to perform an operation of the sink device 260 independent from operations of the source device 210 or a dependent request to perform an operation of the sink device 260 dependent on operations of the source device 210. According to various embodiments of the present disclosure, the controller 280 may determine whether the designated request is an independent request or a dependent request in relation to an operation of the source device 210.

The dependent request refers to a request for performing an operation of the sink device 260 dependent to an operation of the source device 210. According to various embodiments of the present disclosure, the dependent request refers to a request for the source device 210 transmits new media data or for the source device 210 to perform a new operation and to transmit a result thereof, such that the sink device 260 receives a designated request and performs an operation corresponding thereto.

For example, examples of dependent requests include fast playback of content including music or moving pictures, rewinding of content, use of additional data regarding content (e.g., descriptions of the content, moving pictures or music related to the content, and/or the like), and/or the like.

An independent request refers to a request for performing an operation of the sink device 260 independent from an operation of the source device 210. According to various embodiments of the present disclosure, an independent request refers to a request for the sink device 260 to receive a designated request and to perform an operation corresponding thereto without an operation of the source device 210.

For example, examples of independent requests may include a request for zooming in/out a screen image, a request for stopping playback of content currently being played back, a request for editing a screen image, a request for modifying a screen image, such as scroll or rotation of the screen image, and/or the like.

At operation 330, if a designated request is an independent request, the designated request is carried out (e.g., performed) at the sink device 260. For example, when a designated request is an independent request (e.g., in response to the designated request being determined to be an independent request at operation 320), the designated request is performed by the sink device 260. The operation 330 may be performed by the controller 280.

According to various embodiments of the present disclosure, a determination is made as to whether a designated request input by a user is an independent request or a dependent request, and the sink device 260 performs an operation corresponding to the designated request without an intervention of the source device 210 for carrying out the designated request based on a result of the determination.

According to various embodiments of the present disclosure, if the designated request is an independent request, the sink device 260 may perform an operation corresponding to the designated request before the source device 210 carries out the designated request. In other words, when a designated request is input and the determination of whether the designated request is an independent request or a dependent request is performed, the sink device 260 carries out the designated request without receiving media data from the source device 210 for carrying out the designated request.

According to various embodiments of the present disclosure, in the display device controlling method 300, a sink device and a source device are shared (e.g., connected) to each other by using a mirroring service, and, when the sink device receives a designated request for performing a designated operation of the sink device, an operation desired by a user may be quickly performed and a screen image corresponding thereto may be provided. In detail, if a request of a user is an independent request, the sink device performs a corresponding operation without performing an operation at the source device, thereby minimizing a period of time elapsed for providing a screen image desired by the user to the sink device.

Figure 4:
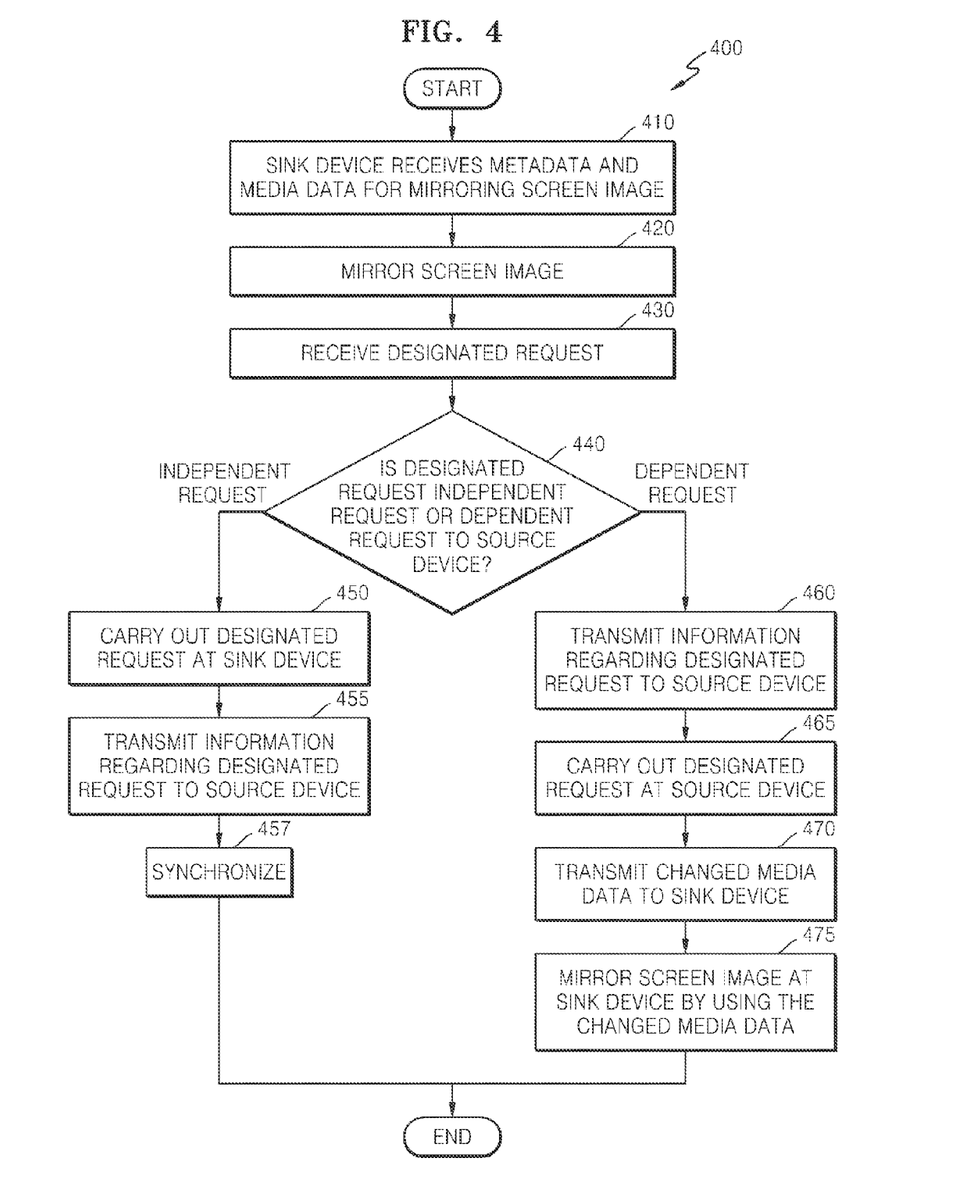
FIG. 4 is a flowchart showing a display device controlling method according to an embodiment of the present disclosure.

FIG. 4 is a flowchart showing a display device controlling method according to an embodiment of the present disclosure.

Referring to FIG. 4, operations 410, 420, and 430 are similar (e.g., identical) to the operations 310, 320, and 330 of FIG. 3.

Furthermore, operations and technical feature of a screen image mirroring method according to various embodiments of the present disclosure are similar (e.g., identical) to those of the operations and the technical feature of the display device according to an embodiment of the present disclosure as described above with reference to FIGS. 1 and 2. Therefore, descriptions already given above with reference to FIGS. 1 and 2 will be omitted. Hereinafter, the display device controlling method 400 will be described with reference to FIGS. 2 and 4.

In the display device controlling method 400, at operation 410, the sink device 260 receives metadata and media data for mirroring a screen image from the sink device 260. The sink device 260 may receive the metadata and media data for mirroring a screen image from the sink device 260 using the communication module 270 of the sink device 260. According to various embodiments of the present disclosure, the communication module 270 may receive transmission stream TS, which includes the media data and the metadata and is streamed.

At operation 420, a mirroring screen image is displayed by using the media data received at operation 410. The display of the mirroring screen image by using the media data may be performed by the display unit 290 under the control of the controller 280. According to various embodiments of the present disclosure, the received transmission stream TS is de-packetized and the de-packetized data is decoded. Thereafter, a screen image data is generated by using decoded media data and the screen image data is displayed.

At operation 430, a designated request is received by detecting a user's operation. The designated request may be received by the UI unit 295. For example, the UI unit 295 may detect the user's operation corresponding to the designated request.

For example, the display unit 290 may display a playback window of a moving picture player including a moving picture screen image and a menu window for controlling playback of moving pictures. If the display unit 290 is integrated with a touchpad, then, when a user touches a designated menu included in the menu window, the UI unit 295 may detect a location of a touched point and may transmit information regarding the detected location to the controller 280.

At operation 440, a determination is made as to whether the designated request is an independent request or a dependent request. For example, by using the metadata received at operation 410, a determination is made as to whether the designated request received at operation 430 is an independent request or a dependent request with respect to the source device 210. According to various embodiments of the present disclosure, the controller 280 may determine whether the designated request is an independent request or a designated request (e.g., in relation to the source device 210).

According to various embodiments of the present disclosure, metadata is data used by a sink device to analyze a designated request and may include information for location of a menu on the user interface screen corresponding to a request. According to various embodiments of the present disclosure, the metadata may include information in which location information regarding a designated point on a UI screen image is matched to a designated menu corresponding to a request. Accordingly, the controller 280 may interpret a designated request using the metadata when touched location is acquired. According to various embodiments of the present disclosure, the metadata may include information regarding at least one from between location information including at least one from among information, pixel locations, and coordinates information regarding points on a UI screen image and information regarding at least one menu included in the UI screen image.

In response to detection of the user input corresponding to the designated request, the controller 280 receives location information regarding at which the user input is input. For example, when a designated request is input at operation 430, the controller 280 receives location information regarding a point touched by a user that is detected by the UI unit 295. Thereafter, by using the information regarding the point touched by the user, the controller 280 may search for a menu corresponding to the point touched by the user in the metadata.

The controller 280 may find out (e.g., determine) a menu corresponding to a user's request without receiving and analyzing control information from the source device 210.

According to various embodiments of the present disclosure, at operation 440, a user's operation is detected, and location information including at least one from among location information, pixel locations, and coordinates information regarding a point corresponding to a location at which the user's operation is detected. Thereafter, a menu corresponding to the obtained location information is recognized as a designated request based on the metadata. Thereafter, a determination is made as to whether the designated request is an independent request.

If the designated request is determined to be an independent request at operation 440, then, at operation 450, the sink device 260 carries out (e.g., performs) the designated request.

Thereafter, at operation 455, information regarding the designated request may be transmitted to the source device 210. Therefore, source device 210 may perform an operation corresponding to the designated request.

Thereafter, at operation 457, the source device 210 and the sink device 260 may be synchronized. For example, after the designated request is carried out (e.g., performed), the source device 210 and the sink device 260 may be synchronized.

The operations 450 through 457 will be described below in detail with reference to FIG. 5.

Figure 5:
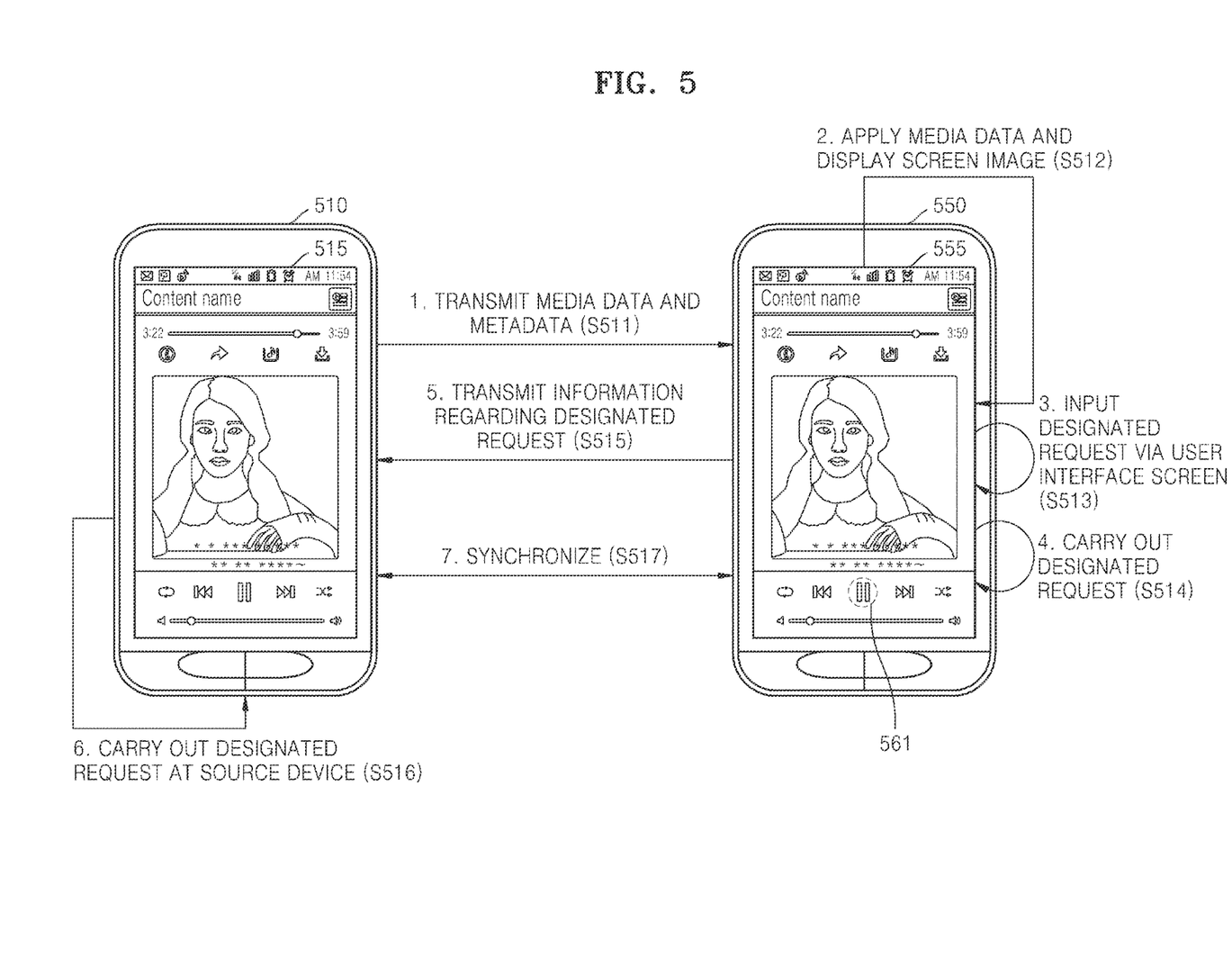
FIG. 5 is a diagram for describing operations of a display device controlling method according to an embodiment of the present disclosure in detail.

FIG. 5 is a diagram for describing operations of a display device controlling method according to an embodiment of the present disclosure in detail.

Referring to FIG. 5, a source device 510 and a sink device 550 are respectively similar (e.g., identical) to the source device 210 and the sink device 260 of FIG. 2. Therefore, descriptions already given above with reference to FIG. 2 will be omitted. FIG. 5 shows a case in which the source device 510 executes a moving picture player and displays a screen image 515 including a video screen image and menus for controlling playback of moving pictures. The sink device 550 mirrors the sink device 510 and displays a screen image 555 similar (e.g., identical) to the screen image 515.

At operation S511, media data including the screen image 515 and metadata are transmitted from the source device 510 to the sink device 550.

At operation S512, the sink device 550 decodes the received media data and displays the corresponding screen image 555.

At operation S513, a designated request is received via a screen image of the sink device 550. For example, a user touches a point at which a stop menu 561 is displayed. Thereafter, the controller 280 of the sink device 550 determines a menu corresponding to the touched point based on at least one from among coordinates information regarding the screen image 515 included in the received metadata, pixel location information, point information, and/or the like.

Thereafter, if the designated request is an independent request, then, at operation S514, an operation corresponding to the touched menu (e.g., an operation according to the designated request) is performed. In the above-stated example, an operation corresponding to the touched stop menu 561 is performed, thereby stopping playback of moving pictures currently being displayed.

As described above, in the display device controlling method 400, a designated request is analyzed by using metadata and, if the designated request is an independent request, a corresponding operation is executed (e.g., immediately). Therefore, a user's operation may be quickly responded, thereby providing a screen image desired by the user.

At operation S515, information regarding the designated request may be transmitted to the source device 510. By transmitting an input designated request to the source device 510, an operation of the source device 510 may be updated or synchronized based on the sink device 550.

At operation S516, the source device 510 may carry out the designated request. In the above-stated example, because an operation corresponding to the stop menu 561, which is the designated request, may be performed, playback of moving pictures currently being displayed is stopped.

According to various embodiments of the present disclosure, after a designated request is carried out by the sink device 550, the sink device 550 and the source device 510 may be synchronized with each other. According to various embodiments of the present disclosure, when a designated request is received, a synchronizing operation may be performed even before the sink device 550 to perform an operation corresponding to the designated request. According to various embodiments of the present disclosure, the sink device 550 and the source device 510 may perform an operation corresponding to the designated request (e.g., modification of a screen image, modification of data, modification of operation time, and/or the like), thereby synchronizing the sink device 550 with the source device 510.

Referring to FIG. 4, if the designated request is determined to be a dependent request at operation 440, then, at operation 460, information regarding the dependent request is transmitted to the source device 210. According to various embodiments of the present disclosure, the communication module 270 may transmit the information regarding the dependent request to the source device 210, under the control of the controller 280.

At operation 465, the dependent request transmitted at operation 460 is carried out (e.g., performed) by the source device 210. According to various embodiments of the present disclosure, the controller 220 may carry out (e.g., perform) the dependent request.

According to various embodiments of the present disclosure, as operation 465 is performed, a screen image being played back by the source device 210 and data stored in the source device 210 may be changed. At operation 470, the source device 210 transmits changed media data to the sink device 260. According to various embodiments of the present disclosure, the communication module 230 may transmit the changed media data to the sink device 260, under the control of the controller 220. The changed media data may be data transmitted from the source device 210 to the sink device 260 for mirroring a screen image. If a screen image of the source device 210 is changed, then the changed media data may be data including the changed screen image.

At operation 475, the sink device 260 receives the changed media data and mirrors a screen image corresponding to the media data. According to various embodiments of the present disclosure, the display unit 290 may mirror the screen image corresponding to the media data, under the control of the controller 280.

The operations 460 through 475 will be described below with reference to FIG. 6.

Figure 6:
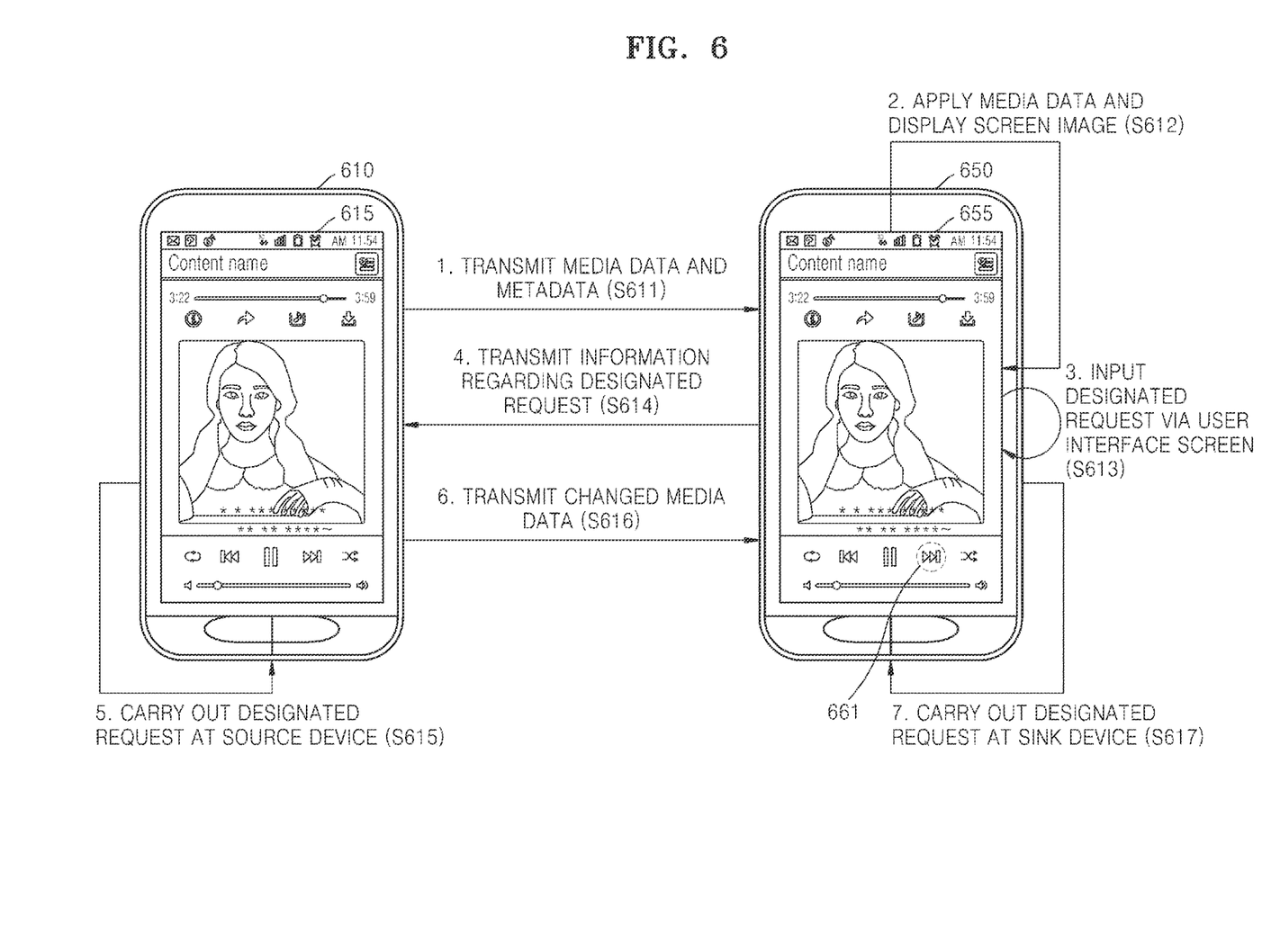
FIG. 6 is a diagram for describing the display device controlling methods according to an embodiment of the present disclosure.

FIG. 6 is a diagram for describing the display device controlling methods according to an embodiment of the present disclosure.

Referring to FIG. 6, a source device 610 and a sink device 650 are respectively similar (e.g., identical) to the source device 210 and the sink device 260 of FIG. 2. Therefore, descriptions already given above with reference to FIG. 2 will be omitted. Similar to FIG. 5, FIG. 6 illustrates a case in which the source device 610 executes a moving picture player and displays a screen image 615 including a video screen image and menus for controlling playback of moving pictures. The sink device 650 mirrors the sink device 610 and displays a screen image 655 similar (e.g., identical) to the screen image 615.

At operation S611, media data including the screen image 615 and metadata are transmitted from the source device 610 to the sink device 650.

At operation S612, the sink device 650 decodes the received media data and displays the corresponding screen image 655.

At operation S613, a designated request is received via a screen image of the sink device 650. For example, a user touches a point at which a fast playback menu 661 is displayed. Thereafter, the controller 280 of the sink device 650 determines a menu corresponding to the touched point based on at least one from among coordinates information regarding the screen image 615 included in the received metadata, pixel location information, point information, and/or the like.

Thereafter, if the designated request is a dependent request, then, at operation S614, information regarding the received designated request is transmitted to the source device 610.

At operation S615, the source device 610 may carry out (e.g., perform) the designated request. In the above-stated example, the source device 610 performs an operation corresponding to the fast playback menu 661, which is the designated request, and thus the source device 610 plays back moving pictures currently being displayed at 2× speed, 4× speed, or the like.

At operation S616, media data changed as the source device 610 carries out (e.g., performs) the designated request is transmitted to the sink device 650. In the above-stated example, the changed media data becomes media data corresponding to the moving pictures being reproduced at a designated speed.

At operation S617, the sink device 650 receives changed media data and displays a screen image generated by decoding the changed media data. In the above-stated example, the sink device 650 may display moving pictures being reproduced at a designated speed. Accordingly, the sink device 650 effectively carries out (e.g., performs) the designated request (e.g., in response to and using the receiving the changed media data).

The present disclosure can also be embodied as computer readable codes on a non-transitory computer readable recording medium. The non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, optical data storage devices, and/or the like. The non-transitory computer readable recording medium can also be distributed over network coupled computer systems so that the computer readable code is stored and executed in a distributed fashion.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A sink device comprising:
a communication module configured to receive metadata and media data for mirroring a screen image from a source device;
a display configured to display a screen image corresponding to the media data; and
at least one processor,
wherein, if a request is received by the sink device, the at least one processor is configured to determine whether the request is:
an independent request for requesting to perform an operation of the sink device that is independent of an operation of the source device, or
a dependent request for requesting to perform an operation of the sink device that is dependent on an operation of the source device, by using the metadata received from the source device, and
wherein, if the request is the independent request, the at least one processor is further configured to carry out the independent request at the sink device.

2. The sink device of claim 1, wherein, if the request is the independent request, the at least one processor is further configured to:
perform an operation corresponding to the independent request at the sink device before the dependent request is carried out by the source device.

3. The sink device of claim 1, wherein, the metadata is used to analyze the dependent request at the sink device.

4. The sink device of claim 1, further comprising:
a user interface for receiving the request via a user interface screen displayed in the sink device,
wherein the display displays a mirroring screen image at the sink device by mirroring a screen image displayed at the source device using the media data.

5. The sink device of claim 4, wherein the metadata includes information for location of a menu on the user interface screen corresponding to a request.

6. The sink device of claim 4, wherein the metadata comprises information regarding at least one of:

(i) location information including at least one of information, pixel locations, and coordinates information regarding points on a user interface screen, and (ii) information regarding at least one menu included in the user interface screen.

7. The sink device of claim 6, wherein the at least one processor is further configured to:

detect a user's operation and obtain the location information corresponding to a location at which the user's operation is detected, recognize the menu corresponding to the obtained location information as the request, and determine whether the recognized request is the independent request.

8. The sink device of claim 1, wherein, if the request is the independent request, the at least one processor is further configured to:

transmit information regarding the independent request to the source device, and perform an operation corresponding to the request at the source device.

9. The sink device of claim 1, wherein, if the request is the dependent request, the at least one processor is further configured to:

transmit information regarding the dependent request to the source device, perform an operation corresponding to the dependent request at the source device, transmit changed media data corresponding to the operation performed at the source device to the sink device, and mirror the screen image by using the changed media data.

10. The sink device of claim 1, wherein the at least one processor is further configured to synchronize the source device and the sink device after the request is carried out.

11. The sink device of claim 1, wherein the at least one processor is further configured to determine whether the request is included in a list of independent requests stored on the sink device.

12. The sink device of claim 1, wherein the at least one processor is further configured to perform an operation corresponding to the request contemporaneously with reception of the request.

13. The sink device of claim 1, wherein the at least one processor is further configured to perform an operation corresponding to the request independent of transmission of information relating to the request, to the source device.

14. The sink device of claim 1, wherein the dependent request comprises:

at least one of a request for zooming in/out a screen image, a request for stopping playback of content currently being played back, a request for editing a screen image, and a request for modifying a screen image, such as scroll or rotation of the screen image.

15. A method of controlling a display device, the method comprising:

receiving metadata and media data for mirroring a screen image at a sink device from a source device;

wherein, if a request is received by the sink device, determining whether the request is:

an independent request for requesting to perform an operation of the sink device that is independent of an operation of the source device, or a dependent request for requesting to perform an operation of the sink device that is dependent on an operation of the source device, by using the metadata received from the source device; and wherein, if the request is the independent request, carrying out the independent request at the sink device.

16. The method of claim 15, wherein, if the request is the independent request, the carrying out of the request at the sink device comprises performing an operation corresponding to the dependent request at the sink device before the dependent request is carried out by the source device.

17. The method of claim 15, wherein the metadata is used to analyze the dependent request at the sink device.

18. The method of claim 15, further comprising:

displaying a mirroring screen image at the sink device by mirroring a screen image displayed at the source device using the media data; and receiving the request via a user interface screen displayed in the sink device.

19. The method of claim 15, further comprising:

after the request is carried out, synchronizing the source device and the sink device to each other.

20. A non-transitory computer-readable storage medium storing instructions that, when executed, cause at least one processor to perform the method of claim 15.

* * * * *